United States Patent [19]

Blau et al.

[11] Patent Number: 4,507,703

[45] Date of Patent: Mar. 26, 1985

[54] SYSTEM FOR ERROR-PROTECTED OPERATION OF MULTIPANEL, POWER DISTRIBUTION NETWORK SWITCHES

[75] Inventors: Heinrich Blau, Spardorf; Bernd Görtz, Erlangen; Werner Grohmann, Möhrendorf; Wolfgang Meusel; Heribert Niebergall, both of Erlangen; Hermann Waldmann, Weiher, all of Fed. Rep. of Germany

[73] Assignee: Siemens Aktiengesellschaft, Munich, Fed. Rep. of Germany

[21] Appl. No.: 516,352

[22] Filed: Jul. 22, 1983

[30] Foreign Application Priority Data

Aug. 16, 1982 [DE] Fed. Rep. of Germany ....... 3230404

[51] Int. Cl.³ .......................................... H01H 47/00
[52] U.S. Cl. .................................... 361/193; 307/115; 307/116; 307/142; 364/492
[58] Field of Search ........... 307/112, 113, 116, 132 E, 307/139, 142, 91; 361/193; 364/132, 492; 340/825.17

[56] References Cited

U.S. PATENT DOCUMENTS 3,697,846 10/1972 Mueller ........................ 307/142 X
4,234,801 11/1980 Small ........................... 361/193 X
4,318,006 3/1982 Himeno et al. ................. 361/193 X

OTHER PUBLICATIONS

"Siemens-Energietechnik", 1981, No. 1, pp. 20-23.

Primary Examiner—A. D. Pellinen
Assistant Examiner—Derek Jennings
Attorney, Agent, or Firm—Kenyon & Kenyon

[57] ABSTRACT

An arrangement for generating in each switching panel of a multipanel switching facility of an electrical power distribution network a digital operating-state image derived from command inputs and switching position signals. The digital operating state image is transmitted to a collecting memory arranged in a coupling panel which produces an overall image of all switching panels; which overall image is transmitted to the individual switching panels at periodic time intervals. A checking procedure is then conducted in the individual switching panels using the overall image. The arrangement utilizes microprocessors which are coupled to one another so as to exchange data via several transmission paths which are one-bit wide. This arrangement obviates the need for an interlock cable harness in the switching panels and cross-cabling between the switching panels.

14 Claims, 8 Drawing Figures

SYSTEM FOR ERROR-PROTECTED OPERATION OF MULTIPANEL, POWER DISTRIBUTION NETWORK SWITCHES

BACKGROUND OF THE INVENTION

This invention relates generally to methods and apparatus for operating a switching facility of the type having several switching panels in an electric power distribution network, and more particularly, to a system wherein there is provided protection against switching errors by observing predetermined safety conditions. Such error protection is achieved by interlocking respective switches such that switching is prevented until all safety conditions pertaining to the switching operation are met. Such safety conditions include, for example, disconnect switches must not be switched under load; grounding switches must be switched only after the system conductor which is to be grounded is free of voltage; and circuit breakers must not be closed if a disconnect switch in the same circuit is in a "trouble" position.

In accordance with the journal "Siemens-Energietechnik", 1981, no. 1, pages 20–23, it is known in the field of electric switching error-protection equipment to achieve interlocking of switches by means of contacts of auxiliary relays which are operated independently of the positions of the switches. The relay contacts are wired between the individual equipment associated with a switch panel in a so-called interlocking cable harness, and equipments of different switch panels by means of cross wiring. In known arrangements, the cross wiring, in particular, is relatively elaborate and any expansion requires additional wiring for all existing equipments. The requirements of additional wiring also applies to expansions which are purely internal to the switch panel. Accordingly, with such an electromechanical design for an interlocking system there is the additional danger that defects or discontinuities in the wiring remain undetected.

It is, therefore, an object of this invention to provide a method of operating a multipanel switch for an electric power distribution network which does not require relays, interlock cable harnesses, or cross wiring, to perform the interlocking function.

SUMMARY OF THE INVENTION

The foregoing and other objects are achieved by this invention which provides a system for operating a switching facility consisting of several switching panels in an electric power distribution network with protection against switching errors. In accordance with a method aspect of the invention, a digital image of the operating state of each switching panel is generated by the signals of the switches such that a requested switching action is simulated. The digital images of the individual switching panels are cyclically interrogated continuously and sequentially, and are transmitted to a central collecting memory. The digital images are assembled in the central collecting memory to form an overall image which is then retransmitted to each switching panel and stored until the next overall image arrives. When a switching action is requested, a check for switching error protection interlock conditions is conducted in the respective switching panel with the aid of the overall image which subsequently arrives. The switching action which is requested is executed if the result of the check is negative.

In some embodiments of the invention, only the changes in the digital images are transmitted sequentially and cyclically between the switching panels and the central collecting memory. In such an embodiment, the transmission occurs over several cycle periods.

In accordance with an apparatus aspect of the invention, a switching panel processor is provided for each switching panel and connected to the central image collecting processor via a bidirectional, or to unidirectional, signal lines. Position-indicating signals and switching action request signals are conducted to the switching panel processors. Switching commands which are delivered by the switching panel processors are linked by AND logic with the associated switching request signals for release.

In one embodiment, the signal transmission paths which lead to and from the processors are interrupted by DC signals. The position-indicating signals and the switching request signals are conducted to the switching panel processors via optical couplers. Latching relays are provided and can be actuated by the output signals of the switching panel processors.

BRIEF DESCRIPTION OF THE DRAWINGS

Comprehension of the invention is facilitated by reading the following detailed description in conjunction with the annexed drawings, in which.

DETAILED DESCRIPTION

Figure 1:
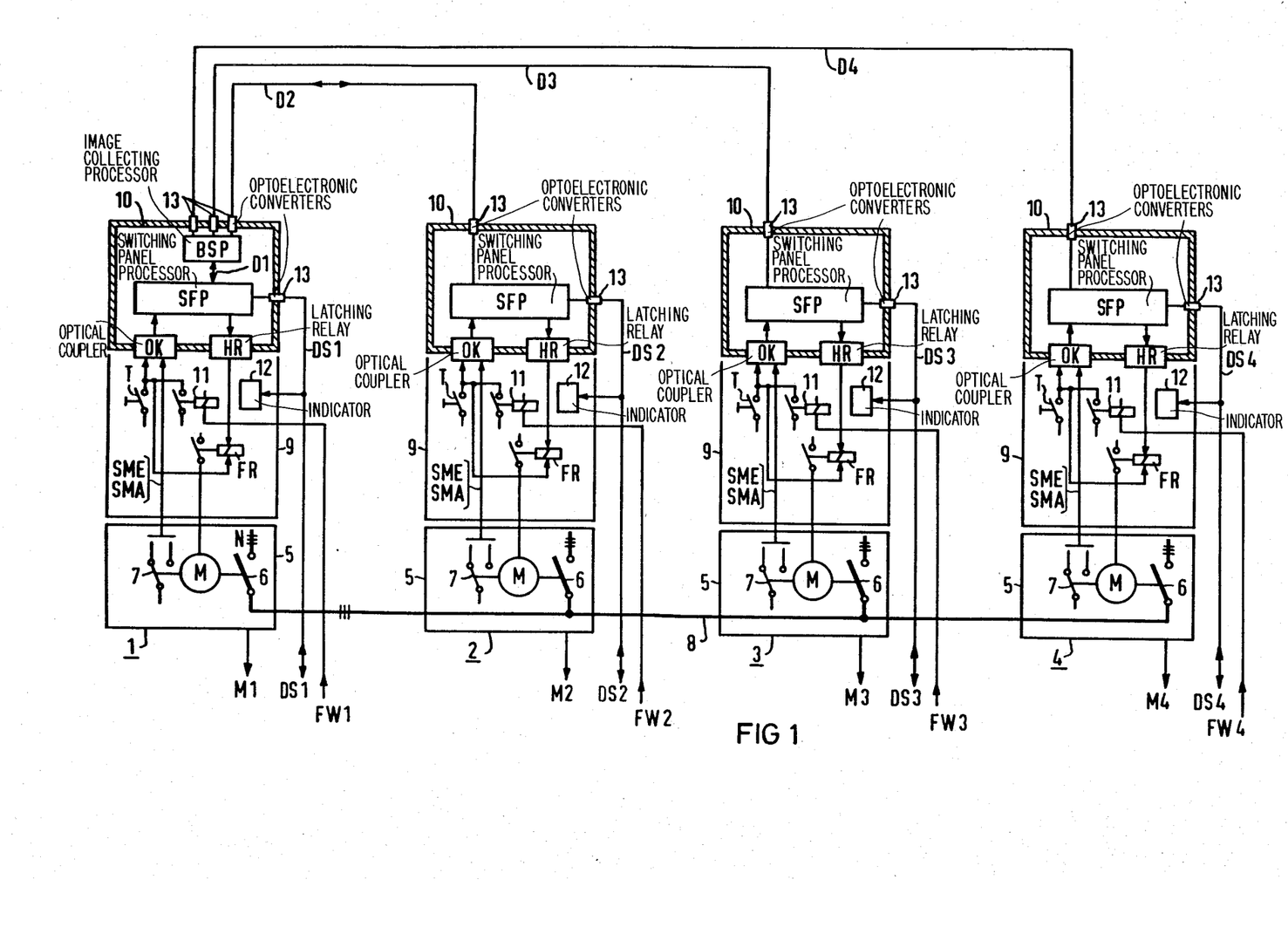
FIG. 1 is a schematic and function block representation of a switching facility having four switching panels.

FIG. 1 is a schematic and block diagram of a switching facility having four switching panels 1–4, and is a part of a switching station (not shown). Switching panels 1–4 are of essentially identical design and are each provided with a switching cell 5 each containing a switch 6 by which power consumers or power generators are connected to a power supply network N (not shown entirely). Generally, switches 6 include disconnect switches, power switches, and grounding switches. However, only one switch 6 is shown for each switching cell 5 to preserve the clarity of the drawing. In this specific illustrative embodiment, switch 6 in switch panel 1 couples a bus bar 8 to another bus bar N, while subsequent consumers can be connected electrically to bus bar 8 by means of switches 6 in switch panels 2-4. Switching panel 1 represents a so-called "coupling panel" and switching panels 2-4 are called "outgoing branches."

Switching cells 5 of the individual switching panels may be removed physically from the other components of the switching panels. Drives M of switches 6, as well as the position-indicating devices 7 which are mechanically coupled to drives M, are arranged in switching cells 5. Each switching panel further contains a command input/command output unit 9 and an electronic switching error interlocking device 10.

Each interlocking device 10 contains a switching panel processor SFP. All switching panel processors SFP can be in communication via signal lines D1 to D4 with a central processor BSP which is arranged in coupling panel 1. Central processor BSP will hereinafter be referred to as "image collecting processor." With respect to the present invention, the term "processor" is understood to mean quite generally a device which is capable, upon external initiation, to execute a given number of successive information-linking steps, and to store the results. This may therefore involve a stepping mechanism with associated logic circuitry and storage devices, a freely programmable control, or a commercially available microprocessor with associated working memory. Processors SFP and BSP are disposed in a housing which is metallically shielded against electromagnetic interference. Switching panel processors SFP receive via optical couplers OK signals requesting switching actions, which are called "command inputs." Such command inputs deliver, after testing the interlock conditions, so-called "command outputs" for relays FR via latching memories, illustratively latching relays, which perform the requested switching action. The switching panel processors further receive via optical couplers position-indicating signals for the "on" position (SME) and for the "off" position (SMA) of switches 6. Switching request signals can be entered via respectively associated keys T which can be operated at the switching panel, and which are assigned to individual ones of switches 6. Alternatively, switching request signals are entered by means of respective contacts arranged to be actuated by remote control relays 11 which can be actuated by remote control signals FW 1 to FW 4 emitted by the station (not shown).

As shown in FIG. 1, AND logic is provided for actuating the coils of release relays FR, between the command inputs effected by the keys T or the contacts of the remote control relays 12 and the command outputs delivered by the switching panel processors. It is thereby assured that processor SFP alone cannot cause a switching action, but that such action requires the actuation of a further contact which cannot influenced by the processor.

The signal lines which connect the image collecting processor BSP to the switching panel processors SFP of the individual switching panels can be designed bidirectionally, or as two unidirectional transmission paths for each direction of communication. A particularly low power requirement is achieved if lines D2 to D4 are one-bit wide. The signals to be transmitted from end to end to processor BSP can then be transmitted serially in a known manner in the form of pulse messages. In order to avoid interference, it is advantageous to decouple the processors DC-wise from the outside. Such DC decoupling is effected by optoelectronic converters 13.

Transmission paths D2 to D4 are realized either as light guides, or two-time optoelectronic conversion at each end, as will discussed hereinbelow with respect to FIG. 6. A further, similarly operated transmission path D1 is provided between processors BSP and SFP in switching panel 1. Transmission path D1, however, has no optoelectronic converters. Switching panel processors SFP are further connected to signal lines DS1 to DS4 which lead to the controlling station (not shown), via which error indications, and other signals, can be transmitted. In each switching panel there is provided an indicating device 12 which is connected to an associated one of signal lines DS1 to DS4. Indicating devices 12 provide visual indication of the operating state of the associated switching panel, or of the switching facility. It should be noted here, for sake of completeness, that reporting lines M1 to M4 which lead from respective switching cells 5 to the station are also provided. Via such reporting lines, after corresponding analog/digital conversion, by means not shown in detail, the instantaneous values of interest for the current flowing in the switching panel and the voltage of the bus bar are transmitted to the station and can be evaluated there for related tasks such as the differential bus bar protection.

A digital display of the operating state of all switches of a switching panel is generated in the memory of each switching panel processor SFP in response to signals which are generated by the position indicators 7; which signals correspond to the actual positions of switches 6. If a switching action is requested, either by actuating key T assigned to the corresponding switch at the site, or by a remote control signal having an equivalent effect on relay 11, the switching action is registered as such, and is simulated in the digital image generated by the switching panel processor. Thus, the switching action is reported as having already started.

Image collecting processor BSP requests at regular intervals that the switching panels processors SFP of the individual switching panels 1 to 4 deliver to it the actual image of the operating state of the switches in cyclic succession via lines D1 to D4. Such images have been previously prepared by switching panel processors SFP, including possibly existing switching panel requests (command inputs). In image collecting processor BSP, the individual digital images of the switching panels are combined to form a digital overall image which is subsequently transmitted back to the individual switching panel. The switching panel processors of the individual switching panel check the switching error protection interlocking conditions by means of the overall image. If the interlock check produces a negative result, i.e., the requested switching action corresponds to a situation which does not violate the switching error protection safety rules, the requested switching action is permissible, and a corresponding command for actuating relay FR is issued by switching panel processor SFP via one of the latching relays HR. In this manner, the execution (release) of the requested switching action is initiated.

Figure 2:
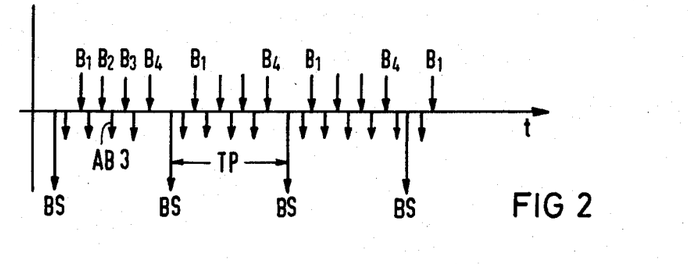
FIG. 2 is a timing diagram illustrating the sequence in time of the input and output signals of the image collecting processor.

FIG. 2 is a timing diagram illustrating the sequence in time of the input and output signals of the image collecting processor BSP. In this figure, the arrows which are directed to time axis t indicate the individual image pulse diagram B1 to B4 supplied at the individual point in time by switching panel processors SFP in switching panels 1 to 4. The arrows which are directed away from time axis t represent information emanating from the image collecting processor, which information exists in the pulse diagram BS of the overall diagram of the switching facility. The information is emitted at regular time intervals TP simultaneously to all switching panel processors. Each switching panel processor delivers its current image of the operating state to image collecting processor BSP in response to sequential requests to the individual switching panel processors. In FIG. 2, such a request signal addressed to the switching panel processor located in switching panel 3 is designated as AB3.

Figure 3:
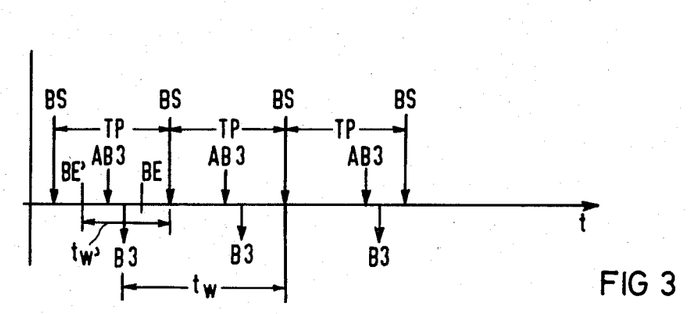
FIG. 3 is a timing diagram illustrating the signals received and delivered by an illustrative switching panel processor.

FIG. 3 is a corresponding timing diagram illustrating the received and delivered signals of an illustrative switching panel processor SFP arranged in switching panel 3. It is evident from this presentation that, while a command input BE that occurred after the delivery of the individual image B3 to the image collecting processor is simulated by the switching panel processor, it cannot be considered in the overall image BS complied by the image collecting processor. This applies also for the corresponding command inputs in the other switching panels. The problem of preventing the output of unpermissible combinations of switching actions in different switching panels can be solved in such a manner that the interlock check does not take place at the point in time of the next total image, but always at the point in time of the total image BS after the next following one arriving after delivery of the individual image. Then, waiting times $t_w$ would result in all switching panel processors between the delivery of their individual image B3 and the interlock check required for releasing the requested switching action, which waiting times are larger than the cycle period TP determined by the image collecting processor. As indicated, cycle period TP is the time that passes between two successively emitted overall images BS.

In accordance with a further embodiment of the invention, the waiting times, on the average, can be shortened considerably. This can be achieved by carrying out the foregoing procedure, only in those cases in which a command input BE in the respective switching panel takes place after its individual image (B3 in FIG. 3) is delivered. In those cases where this command input (BE' in FIG. 3) occurs before the switching panel individual image is delivered, the interlock check is performed in advance by means of the overall image BS arriving as the next following one.

A further reduction of the time required for the information exchange between the switching panel processors and the image collecting processor can be achieved by a further modification of the method according to the invention. The modified method consists in that, during the individual cycle period TP, only the changes of the digital images, i.e., changes in the switch position and command inputs and optionally also information indicating that nothing has changed in the switching panel, are transmitted between the image collecting processor BSP and the switching panel processors SFP. The diagrams of the corresponding pulses to be transmitted are substantially shorter than the diagrams of the pulses transmitted for the complete individual image or the complete overall image. This results in a considerable shortening of cycle period TP even if acknowledgment steps are additionally provided for safety, which may include each switching panel processor sending back information immediately after it is received to the image collecting processor for comparison. Similarly, for safety, it is advantageous to transmit, from time to time, illustratively after a 100 or 1,000 cycle periods TP, the complete images once between the image collecting processor and the individual switching panel processors.

It is advantageous not to simulate the intended switching action at all if the respective switching processor determines, on the basis of the last received overall image, that the safety rules would be infringed. Thus, a preliminary interlock check is performed immediately after the occurrence of a switching request using the overall image BS which was received last and which is stored in the switching panel processor. This preliminary interlock check suppresses, in the event of a positive result, the simulation of the switching action such that the latter does not appear in the overall image which is sent later.

Figure 4:
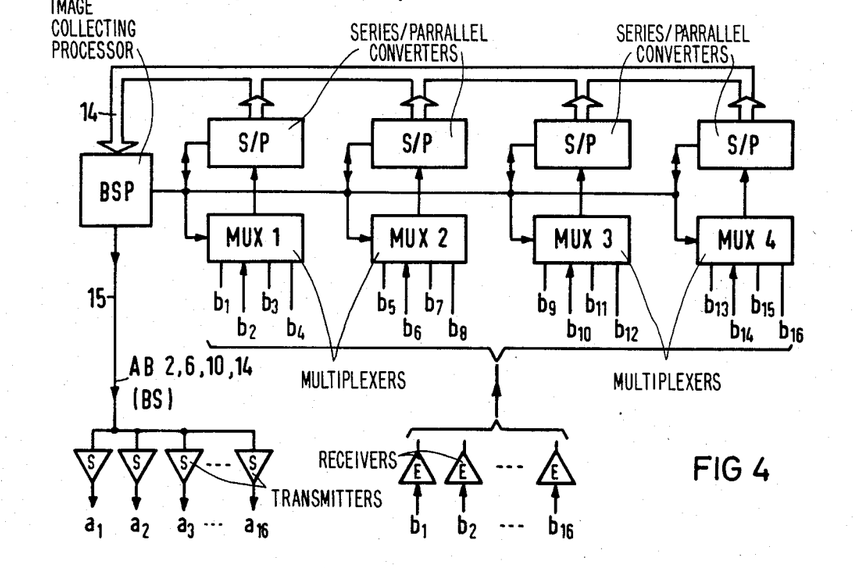
FIG. 4 is a block diagram of an embodiment of the invention wherein the time required for information exchange between the panel processors and the image collecting processor is reduced.

FIG. 4 is a block diagram illustrating an embodiment of the method of the invention wherein the time required for the mutual information exchange between the individual switching panel processors SFP and the image collecting processor BSP can be reduced further. This embodiment of the method can always be used if the input information can be processed by the image collecting processor BSP faster than it can be transmitted on the signal lines. In FIG. 4, the image collecting processor BSP is connected via data bus 14 to four series/parallel converters S/P each of which is addressed on the input side by a multiplexer MUX1 to MUX4 with serial information in the form of pulse messages b1 to b16, always by one of the receiving lines which are similarly designated with b1 to b16. Serial-parallel converters are interfaced modules which are commercially available under the designations Zilog Z80 SI0, Motorola 6850 (ACIA) or Intel 8251 (USART), which operate to convert serial information one-bit wide into information several bits wide (bytes) and to transmit it simultaneously in parallel along the data bus.

In the illustrative embodiment described herein, it will be assumed that data bus 14 has a width of 8 bits, the series/parallel converters S/P always collect 8 successive bits of pulse message, and an appropriate message to the image collecting processor BSP, and the message is transmitted via data bus 14 such that series/parallel converters S/P are available to collect the subsequent 8 bits of data. Multiplexers MUX1 to MUX4, which are also controlled by the image collecting processor BSP, each always connect one of its four input signals to the input of its associated series/parallel converter. In the present example under consideration, pulse messages b2, b6, b10, and b14 contain the individual images of corresponding switching panels 2, 6, 10, and 14, and therefore the associated pulse messages are coupled through to the respectively associated series/parallel converter. The delivery of individual images is initiated by image collecting processor BSP by sending request signals AB2, AB6, AB10, and AB14 via line 15 and a plurality of transmitting members S which are operative on lines a1 to a16 which are connected to respective individual switching panels 1 to 16. Overall image BS which is complied by the image collecting processor and is transmitted via the transmitting members simultaneously to all switching panel processors is present on a line 15. If pulse messages b2, b6, b10, and b14, which correspond to individual images of switching panels 2, 6, 10, and 14 are operative, then multiplexers MUX1 to MUX4 are switched by image collecting processor BSP in such a manner that other ones of the multiplexer inputs, illustratively those addressed by signals b3, b7, b11, and b15 are connected to their respectively associated series/parallel converters. The image collecting processor BSP then delivers the request signals AB3, AB7, AB11, and AB15 to corresponding switching panel processors in switching panels 3, 7, 11, and 15 for delivering an individual image to the corresponding switching panel processors in switching panels 3, 7, 11, and 15. Each switching panel processor is given a particular address identification in the form of a defined bit pattern which is advantageously transmitted at the beginning of the pulse message. With the particular address identification signal, only the identified switching panel processor reacts to the request signal.

Figure 5:
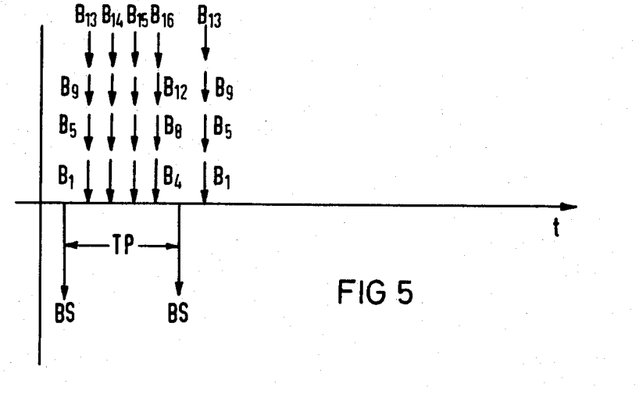
FIG. 5 is a timing diagram illustrating events occurring in the image collecting processor.

FIG. 5 is a timing diagram which illustrates the events in time in image collecting processor BSP, in a manner similar to that shown in FIG. 2. It is clear from this figure that by quadrupling the simultaneously active receiving devices, the number of individual images that can be processed can be multiplied by 4, or if the number of individual images remains the same, the cycle time TP can be reduced accordingly.

Figure 6:
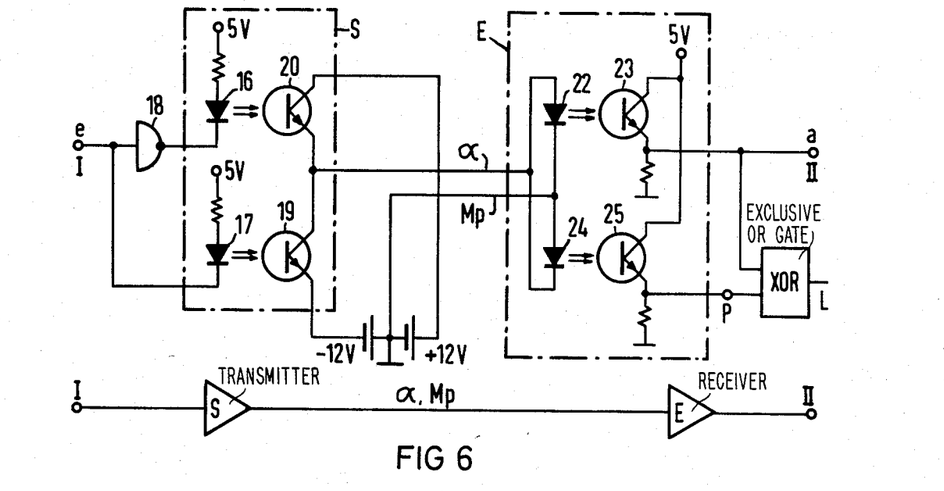
FIG. 6 is a schematic and block representation of an one-bit transmission channel having transmitting and receiving members.

FIG. 6 is a schematic and function block representation of a specific illustrative embodiment for a transmission channel which is one-bit wide. The transmission channel is terminated at its ends I and II by a transmitting member S or a receiving member E, and in the arrangement according to FIG. 1, the transmission channel connects the image collecting memory BSP to a respective switching channel processor SFP in switching panels 2 to 4. A unidirectional transmission path is utilized, and therefore a similar transmission path must be arranged for the transmission of information from end II to end I. The two transmission paths must be arranged antiparallel with respect to one another. A pair of such unidirectional transmission paths arranged antiparallel correspond to one of signal lines D2 to D4 in FIG. 1.

In accordance with the upper portion of FIG. 6, the unidirectional transmission path is realized by means of a two-wire line. A terminal e receives the output signal of image collecting processor BSP. In this specific embodiment, a potential of 5 volts is assumed to correspond to a logical "1" signal and the potential of 0 volts corresponds to a logical "0" signal.

In a transmitter module S, two photodiodes 16 and 17 are connected at their anodes to a voltage source of 5 volts. Terminal e is connected directly to the cathode of photodiode 17 and is coupled via an inverter 18 to the cathode of photodiode 16. If the potential at terminal I is 0 volts, then photodiode 17 conducts and the light emitted by it switches a phototransistor 19 associated therewith into conduction such that the line designated α of the transmission path is connected to the potential of −12 volts provided by a battery. In the situation where a logical 1 signal is present at terminal e such that terminal e bears a potential of illustratively 5 volts, photodiode 17 does not carry current, and transistor 19 is cut-off. The output of inverter 8 bears a potential of 0 volts and photodiode 16 thereby carries current. The light produced thereby switches phototransistor 20 into conduction whereby +12 volts is applied to the line. Thus, one of phototransistors 19 and 20 is always cut-off, while the other one conducts. The potential of the line is +12 volts for a logical 1 signal at terminal e, and −12 volts if the signal at terminal e is a logical 0 signal.

The operation of receiver module E arranged at the end of the transmission line is similar to that described hereinabove for module S. If the line is at the positive potential of +12 volts, a photodiode 22 becomes conductive, and the light therefrom causes an associated phototransistor 23 to conduct such that a logical 1 signal (approximately 5 volts) appears at output terminal a. When the line has a potential of −12 volts, photodiode 24 and its associated phototransistor 25 are conductive such that a logical 0 signal (approximately 0 volts) appears at output terminal a. Of the two phototransistors 23 and 25, one is always conductive and one is always cut-off. Thus, the logical signals at the terminals a and p are always different on the receiving side if the transmission channel is operating properly. Such operation can be monitored relatively simply by an exclusive OR gate XOR which is connected on the input side to terminals a and p, and at its output a permanent 1 signal must appear if the transmission channel functions properly. In embodiments where a common ground is available, to which the junction point between diodes 22 and 24 is connected, return line MP can be eliminated if the battery is grounded.

Figure 7:
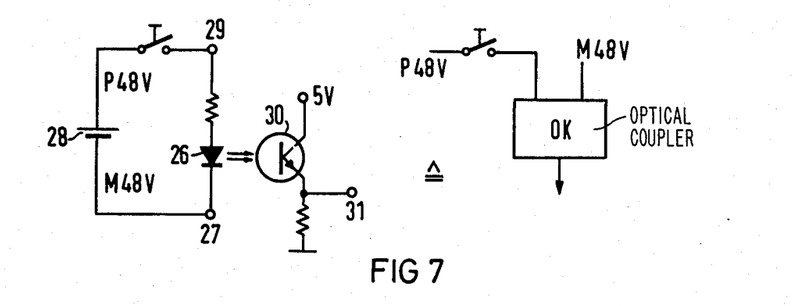
FIG. 7 is a schematic and block diagram of an embodiment of the invention having an optical coupler.

FIG. 7 shows in its left half a schematic representation of an embodiment example of an internal circuit for an optical coupler OK which is shown as a function block on the right-hand side of FIG. 7. The optical coupler can be used for DC decoupling (isolation) and level matching of input signals generated by command input/command output unit 9 of switching panel processor SFP. The cathode of photodiode 26 is connected to terminal 27 which is connected to the negative polarity terminal of a power supply battery 28 designated with M 48 volts. If a second input terminal 29 is connected, illustratively by operating a key, to the positive polarity terminal of the battery, designated with P 48 volts, then current flows through photodiode 26 and the light emitted thereby causes phototransistor 30 to conduct such that output terminal 31 bears a potential of 5 volts, which corresponds to a logic 1 signal. On the other hand, if the key is not operated, current flows neither through photocathode 26 nor phototransistor 30 so that the potential of 0 volts, corresponding to a logical 0 signal, is present at output terminal 31.

Figure 8:
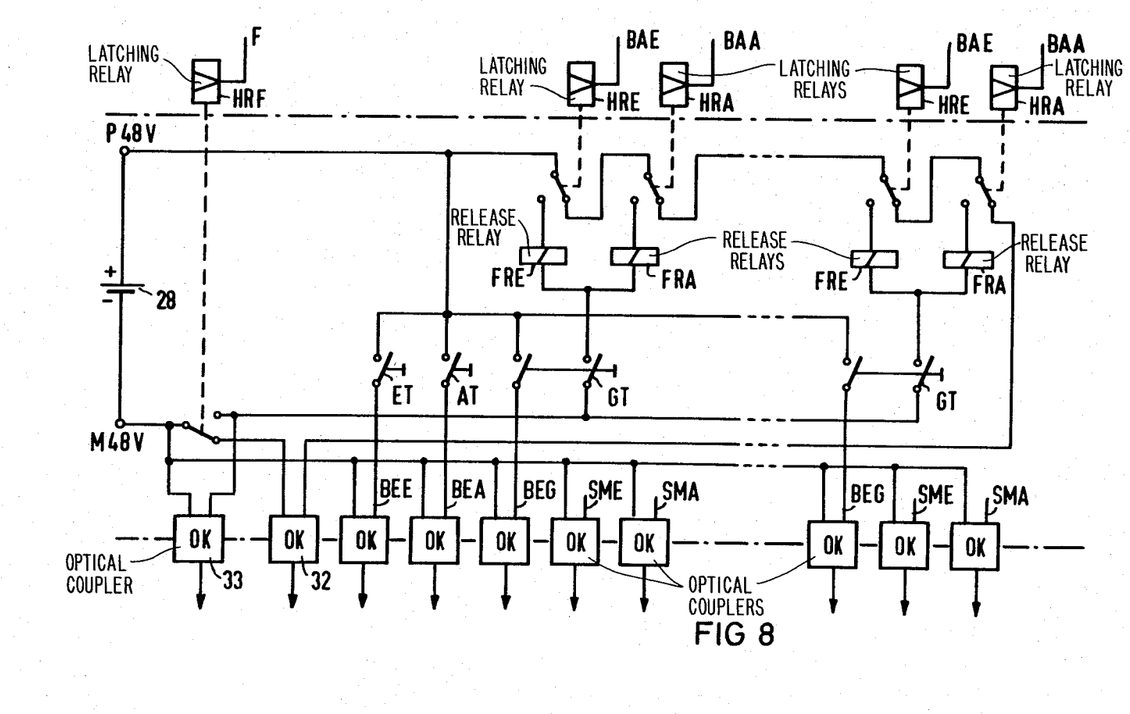
FIG. 8 is a schematic and block representation of a command input/command output unit of a switching panel.

FIG. 8 is a function block representation of the details of a command input/command output unit of a switching panel. In this switching panel, a plurality of high voltage switches 6 are provided, which switches are not specifically designated, and may be circuit breakers, disconnect switches, and grounding switches. Release relays FRE and FRA of two such switches are shown in this figure. Each high voltage switch is provided with an associated release relay FRA which, when operated, is brought into the "off" position by a motor drive, as well as a release relay FRE which, when operated, brings the high voltage switch into its "on" position. With each high voltage switch is further associated an optical coupler OK which is acted upon by the position indicating signals SME and SMA for its "on" and "off" positions. Also associated with each high voltage switch is an equipment selection switch GT together with an optical coupler OK which is activated by the signal BEG upon the operation of the equipment selection switch, for identifying the selected switch, as well as two latching relays which can be addressed by the switching panel processor SFP in response to command output signals BAE and BAA, whereby contacts in the circuits of the coils of the release relays FRE and FRA can be closed. Associated with all high voltage switches in common is a key designated ET and AT, respectively, together with associated optical couplers by command input signals BEE and BEA which occur upon operation of these keys by which it is determined whether the switch being selected by the operation of its equipment key GT is to be brought into its "on" or "off" position. A command input, i.e., the request directed to the switching panel processor for an intended switching action, therefore always includes operating equipment key GT of the corresponding switch and one of keys ET and AT.

Further associated with all switches in common is a latching relay HRF which can be acted upon by a signal F from the switching panel processor, or the final release, i.e., for the execution of the required switching action. Battery 28, with a voltage of illustratively 48 volts, serves as the voltage source for energizing the release relays FRE and FRA, as well as for addressing optical couplers OK on the input side.

The latching relays are operated in response to signals of the switching panel processor which, as noted hereinabove with respect to FIG. 6, may have an excursion of 5 volts. A latching relay is provided with a coil for each of the end positions of this armature and the contact actuated thereby remains in the end position which is associated with the coil which was energized last. The latching relays therefore do not have to be addressed, for making continuous contact, by continuous signals of corresponding length, and, in connection with the invention, further provide the advantage that nothing can change in the operating state of the switching panel if a power failure occurs. The contacts of latching relays in FIG. 8 are switched into their other position (not shown) by the switching panel processor signals F, BAE, and BAA, associated with them. After the command is executed, which can take place by monitoring the corresponding position-indicating signals SME and SMA, they are brought to the positions drawn again by energizing the resetting coil.

A parallel-acting contact of a relay can be associated with each of the keys shown in FIG. 8. The parallel-acting contact of the relay is excited by a remote control signal coming from the station. Additionally, further additional optical couplers may be provided. Thus, the same switching actions can be initiated in the station as are possible at the switching panel, at the site with the keys shown in FIG. 8. The contacts of all latching relays are connected in series and in the event that no switching request is present, a closed circuit is formed with the input circuit of optical coupler 32. The output signal of this optical coupler is a logical 1 signal and can be used by the switching panel processor for monitoring the latching relays.

If a high voltage switch is to be operated, the command input, command output, and release always proceed in accordance with the following schedule: by operating one of keys ET or AT and equipment key GT associated with the switch to be operated, logic 1 signals appear at the outputs of the associated optical couplers such that the location and type of the intended switching action are recognized by the switching panel processor. The switching panel processor then carries out, with the overall image BS received last, a first interlock check (preliminary interlock check) and, if the result is negative, indicating that the requested switching action is permissible, transmits to the corresponding latching relay of the selected switch HRE or HRA a signal which actuates its associated command output contact and prepares the excitation of the corresponding release relays FRE and FRA.

Since the equipment selection key GT is always connected to the coil circuit of the relay, it is thereby ensured in a simple manner that the switching panel processor alone cannot cause a release relay to be energized. After the command output contact of the corresponding latching relay HRE or HRA is closed, whereby the one end of the coil of the release relay is connected to the positive pole P 48 volts of the battery, this potential appears also at the input of optical coupler 33 such that at its output appears a logic 1 signal which can be evaluated by the switching panel processor to indicate that the correct command output contact is closed by the switching panel processor, i.e., that the correct latching relay has been excited, and that no trouble exists in the coil circuit of the associated release relay FRA and FRB, respectively. Thereupon, the switching panel processor awaits for the next or the next total image BS transmitted by the image collecting processor, or for the one after that. Then, a second interlock check is performed, and if the result is negative, the latching relay HRF is actuated, whereby the coil circuit of the selected release relay FRE or FRA is then closed and the requested switching action is executed.

Although the invention has been disclosed in terms of specific embodiments and applications, persons skilled in the art, in light of this teaching, can generate additional embodiments without exceeding the scope or departing from the spirit of the claimed invention. Thus, persons of skill in the art will readily see that a very high degree of operating safety can be achieved with the invention in the operation of high-voltage switching installations, at relatively low cost. The drawings and descriptions in this disclosure are proffered to facilitate comprehension of the invention and should not be construed to limit the scope thereof.

What is claimed is:

1. A method of operating a switching facility with protection against switching errors, the switching facility consisting of several switching panels in an electric power distribution network, the method comprising the steps of:
    generating a digital image of the operating state of each switching panel utilizing signals from switches within said switching panel;
    simulating a requested switching action;
    interrogating continuously and sequentially digital images cyclically from individual ones of the switching panels;
    transmitting said digital images to a central collecting memory;
    assembling said digital images to form an overall image;
    transmitting said overall image to each switching panel;
    storing said overall image in each switching panel until a subsequent overall image arrives;
    requesting a switching action;
    checking for switching error protection interlock conditions in response to information contained in an overall image arriving subsequently and the switching action requested; and
    executing said switching action if the result of said step of checking is negative.

2. The method of claim 1 wherein only the changes of the digital images are transmitted sequentially and cyclically between said switching panels and said central collecting memory; and said steps of interrogating assembling and storing are performed without change at intervals comprising several cycle periods.

3. The method of claim 1 wherein a command input occurs prior to said step of interrogating an individual switching panel, said step of checking being performed with reference to a subsequently received overall image.

4. The method of claim 3 wherein a command input occurs after said step of interrogating an individual switching panel, said step of checking being performed with reference to a second subsequently received overall image.

5. The method of claim 1 wherein prior to performing said step of interrogating there is provided the further step of:
conducting a preliminary check in a switching panel with reference to a previously received overall image; and
suppressing said step of simulating said requested switching action in response to a positive result from said step of conducting a preliminary check.

6. The method of claim 1 wherein said step of transmitting an overall image is performed digitally and serially on signal lines which are one-bit wide and which couple the switching panels to said central collecting memory.

7. The method of claim 6 wherein said step of transmitting comprises a transmission of m switching panel images simultaneously on m signal lines, each one-bit wide, to m intermediate memories and subsequently to said central collecting memory via a bus which is n bits wide.

8. The method of claim 1 wherein prior to performing said step of executing there is provided the further step of conducting a continuity test on a switch actuation circuit associated with a switch which is identifiable after said step of requesting.

9. An arrangement for operating a switching facility consisting of several switching panels in an electric power distribution network with protection against switching errors, the arrangement comprising:
first signal generating means for producing position indicating signals identifying actual switch positions in the several switching panels;
second signal generating means for producing switching action request signals indicating desired switch positions in said switching panels;
a plurality of switching panel processor means arranged in respective ones of the switching panels for generating switching commands to change the actual switch positions in said switching panels;
central image collecting processor means for communicating with each of said switching panel processor means;
a plurality of bidirectional transmission means coupling respective ones of said plurality of switching processor means to said central image collecting processor means for transmitting thereto encoded images of the operating states of switches and for transmitting to said switching processor means from said central image collecting processor means a digital overall image, said encoded images including said position indicating signals and said switching action request signals; and
AND logic means for linking said switching commands delivered by said switching panel processor means with associated ones of said switching action request signals for execution of said switching commands.

10. The arrangement of claim 9 wherein said bidirectional transmission means are each interrupted from conducting DC.

11. The arrangement of claim 10 wherein there are further provided optical coupler means for conducting said position indicating signals and said switching action request signal to said switching panel processor means; and
latching relay means responsive to output signals produced by said switching panel processor means.

12. The arrangement of claim 11 wherein there are further provided:
first and second switching action relays for executing respectively opposite switching actions, each of said switching action relays having a coil with first and second ends, said first ends of said coil being connected jointly;
voltage source means having first and second terminals for supplying a voltage;
first means for coupling said jointly connected first ends of said coils to said first terminal of said voltage supply means, said first means for coupling including a contact of a switch selector and a first latching relay;
second means for coupling for connecting said second ends of said coils to said second terminal of said voltage source means, said second means for coupling including a second latching relay; and
optical coupler means connected in parallel with an input of said first latching relay.

13. The arrangement of claim 12 wherein said first latching relay and said second latching relay are each configured as a double-throw relay having contacts which are connected in a circuit which is closed via an optical coupler.

14. The arrangement of claim 9 wherein there is further provided metallic shield means for surrounding said switching panel processor means and said central image collecting processor means.

* * * * *